United States Patent [19]

Wade et al.

[11] Patent Number: 5,002,286
[45] Date of Patent: Mar. 26, 1991

[54] HAND PROJECTILE, METHOD OF MANUFACTURE AND GAME PLAYED THEREWITH

[76] Inventors: Bill R. Wade; Thelma L. Wade, both of 5th & Washington, Farmington, Wash. 99128

[21] Appl. No.: 346,140

[22] Filed: May 1, 1989

[51] Int. Cl.⁵ .............................................. A63B 65/10
[52] U.S. Cl. ...................................................... 273/425
[58] Field of Search ........ 273/425, 323, 424, 336-339, 273/420, 128 A, 327, 328; 446/236, 431, 153, 450, 265, 242

[56] References Cited

U.S. PATENT DOCUMENTS

| 896,712 | 8/1908 | Crichton | 446/437 X |
|---|---|---|---|
| 1,509,491 | 9/1924 | Sawer | 273/425 |
| 3,119,619 | 1/1964 | Frank | 273/336 |
| 3,254,443 | 6/1966 | Olson | 446/450 |
| 4,023,805 | 5/1977 | Sherrill | 446/46 X |
| 4,063,382 | 12/1977 | McCallum | 273/425 X |
| 4,127,271 | 11/1978 | Moustakas | 273/336 |
| 4,593,913 | 6/1986 | Kochevar | 273/420 |

FOREIGN PATENT DOCUMENTS

| 10406 | 1/1909 | France | 273/323 |
|---|---|---|---|
| 753522 | 7/1956 | United Kingdom | 446/431 |

OTHER PUBLICATIONS

Argo Industries Corp., Water Fun Catalog 3-1965, Under Water Dviing Rings.
Continental Promotions, Inc., Advertising Circular, 1-1972, Flip.N.Fly.

Primary Examiner—Paul E. Shapiro
Attorney, Agent, or Firm—Oldham & Oldham Co.

[57] ABSTRACT

A projectile of hollow or solid plastic in the shape of a circle, ellipse, or other essentially toroidal body, said body having parts that are of appreciably higher density than other parts. This density difference being provided by selected loading of the plastic or use of a metal band on the body.

4 Claims, 2 Drawing Sheets

HAND PROJECTILE, METHOD OF MANUFACTURE AND GAME PLAYED THEREWITH

FIELD OF THE INVENTION

This invention relates to a hand tossable and catchable projectile for playing a game, the method of manufacture of said projectile and the game package. More particularly, this invention relates to an article of manufacture having unique features as a projectile for play between two or more players, said players each tossing one or more articles, viz. projectiles, essentially simultaneously to the other at increasing speed to cause one player to fail to catch the article, thus recording a score for the successful player.

Specifically, this invention is essentially a hollow ring, ellipse or related curved member; all hereinafter referred to generically as a toroidal body, said body in the one embodiment may have at least one band covering at least part of the outside of the body. In the preferred embodiment the said band having a density much greater than the body is inside the hollow ring. The plastic hollow toroidal body with the band is tossed or thrown underhanded or overhanded between at least two players. Each player, on catching the vertically tossed projectile, preferably as quickly as possible, tosses it vertically back to the other player to put that player under pressure to catch the projectile and toss it back before the next projectile arrives. Although the projectile is described as hollow, it may be solid where weight and the amount of plastic used is not a problem.

Also, the hollow body may be filled with foamed or non-foamed plastic or rubber; especially where the plastic or rubber is used to anchor or secure the more dense materials in place within the toroidal body. Where the hollow is filled or partially filled, the dense material does not have to be a metal band such as steel, lead, etc., but may be particles of the dense material such as metal or glass balls or beads and related dense particulate materials. Also, the discussion may be to a metal band but other shapes of the dense material may be used. For instance, the metal or related material in the shape of the hollow cavity may be a solid curved rod or other shape to fit into the cavity or it may be embedded in a plastic or rubber composition.

Each player, at the start of the game, has at least one projectile and preferably two or more, depending on the players' level of skill. The better practice calls for each player's set of projectiles to have a different color from any other player's set. This color difference helps to follow the paths of the projectiles and determine who's projectile may have collided with another projectile.

BACKGROUND OF THE INVENTION

Games such as horseshoes, quoits, etc., are popular but they require the shoes or quoits to be aimed at stakes and are relatively relaxed and a slow paced sport so that the exercise factor is less intense.

The modern exercise trends stress dancing, jogging and related exercises that are relatively more physically intense than horseshoes, quoits and related games. The game of this invention provides a sport requiring more skill and expending more energy than the usual projectile games.

SUMMARY OF THE INVENTION WITH ITS BEST MODE

One aspect of the invention is a hollow plastic toroidal body having at least one part of the total toroidal body significantly heavier than the other part thereof so the body will not move smoothly between the players as the projectile is tossed and thus increase the need for attention and skill.

A further aspect of this invention is that a molten plastic is extruded as a hollow curved element with each end of said element extending through or preferably over a band, said ends being joined to form a toroidal body usable as the game projectile.

Also, some players may prefer that the plastic toroidal body be a solid.

The nature of this invention, its advantage and benefits when used as a game article may be more readily seen and understood by reference to the following drawings wherein.

Figure 1:
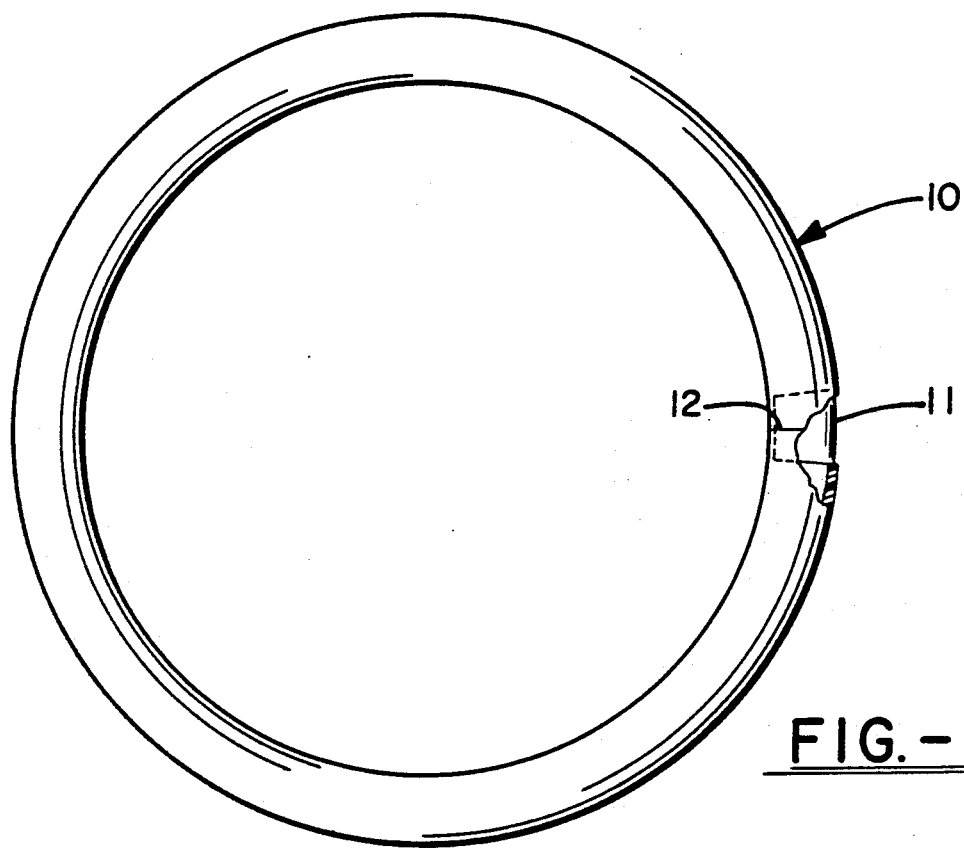
FIG. 1 is a plan view in partial section of an essentially toroidal body having a steel band inside the toroidal body.
Figure 2:
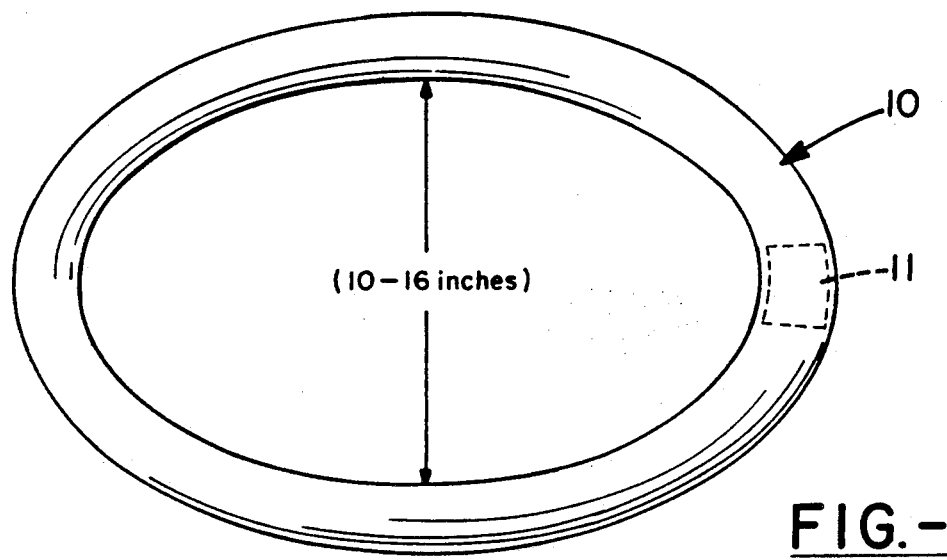
FIG. 2 is a plan view in partial section of another embodiment where the toroidal body is essentially an ellipse in shape.
Figure 3:
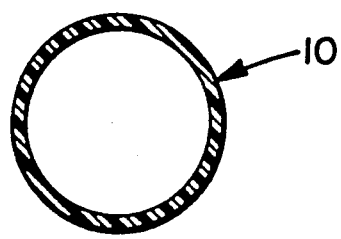
FIG. 3 is a cross sectional view of the toroidal body of either FIG. 1 or FIG. 2.
Figure 4:
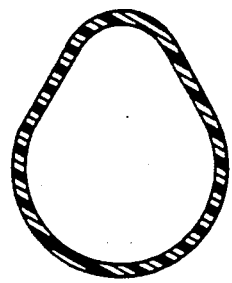
FIG. 4 is a cross sectional view of another embodiment of the toroidal body.

Referring to FIG. 1, the numeral 10 refers to the toroidal body having a band 11 such as a steel or other metal or a plastic band, loaded with a high density filler such as a metal oxide or barites. Thus, the plastic could be any such as the representative examples: polypropylene, a polyamide or an acetaldehyde polymer such as Dielrien. These plastics usually have densities of less than 1.0 depending on the compounding and the specific plastic used.

Figure 5:
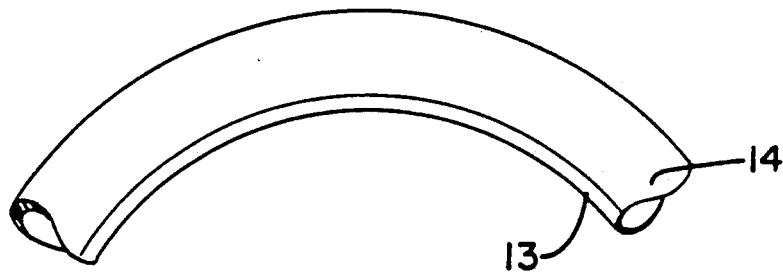
FIG. 5 is a partial cross sectional view of the band.
Figure 6:
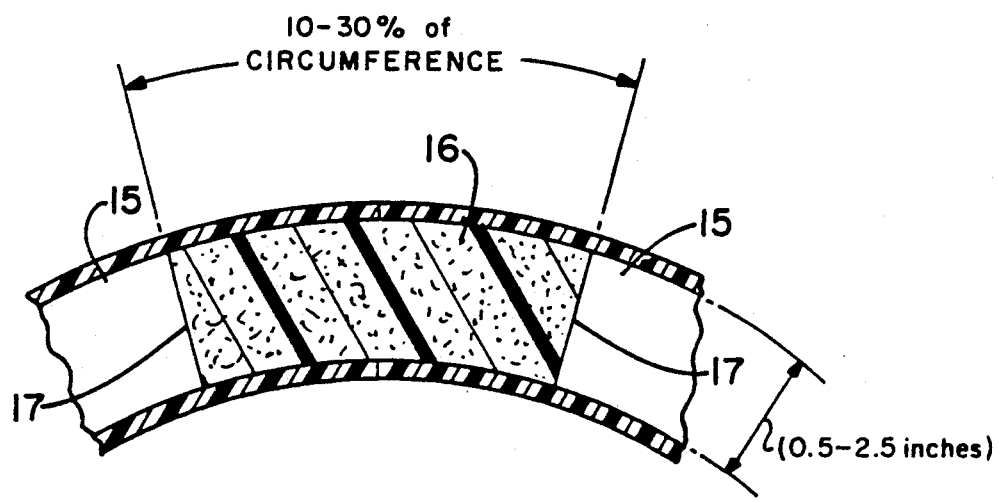
FIG. 6 is a partial longitudinal view of the toroidal body made of two different compounded plastics having appreciably different densities.

The numeral 12 indicates the point where the ends of the plastics are joined. In FIG. 5 the numeral 13 shows the thinnest area of the band, when on the outside of the ring, at its edges relative to center portion 14. On the other hand, FIG. 6 shows that it is possible to eliminate the need for the metal band or high density plastic band. In this embodiment, the hollow plastic element is extruded to give a portion of the toroidal body of high density 16 and part of low density plastic 15 as delineated by edges 17.

In this embodiment the portion of the toroidal body having the high density usually will be greater than where a metal ring is used. Those familiar with plastic loadings will readily know how to compound to get high densities by choosing high density fillers and high loads, i.e., 50 to 200 RPH loadings.

In the preferred embodiment, a steel band is placed in a two part mold with the band displaced at least about 1/16 to ⅛ inch from the outer surface of the mold and then the mold is injected with the molten plastic to encapsulate the band. Then the plastic is allowed to cool and solidify and is removed from the open mold.

To use these toroidal bodies as game projectiles, two players take at least one projectile each and preferably two or more depending on the skill of the players. Then the players establish a base line for each player on the playing field 18 and preferably a box 19 thereon, where each player stands behind their base line with their projectiles.

Then each player as nearly simultaneously as possible, tosses his or her projectile to the other player who will try to catch it. If a player fails to catch the ring, the other player receives a point, unless the projectile was not catchable, being out of the reach of the player. In the case where the projectile is not catchable, i.e., it did not pass over the box, or a so-called plate, was too high or too low, etc., then the player failing to catch the projectile receives a point. In its preferred form, the player must keep one foot fixed during play. Usually, in games such as horseshoes, the players receiving 21 points win the game and that would also be a reasonable score in this case. Also, if a player causes the projectile to collide with another player's projectile the players restart the game but keep the same score.

After the initial throw, the players will, as quickly as possible, toss the projectile back to its sender. If a player, after the initial toss, has two or more projectiles in hand at one time, that player loses a point, reducing that player's score. One object of the game is to keep as many projectiles as possible going to the opponent.

The varying density of the toroidal body causes the projectile to take on an unusual trajectory in its path between the players. This unusual trajectory is a function of the speed as well as a jerk exerted on the projectile by the player, thus making it harder for the opposing player to catch. This trajectory creates varying effects like that experienced by a batter as he or she faces different pitches.

The projectile, having varying densities, moves through paths that are different depending on the speed at which it is tossed. This makes it more difficult to catch.

The projectiles are packaged for sale as a game package for use by two or more players on a playing field. The playing field may be circular when more than two pairs of players are involved. The package comprises a container containing at least one set and preferably two or more sets of projectiles, each set of projectiles having a color different from the other and containing at least one projectile (usually 2 or 3) per set and a list of game rules.

In one embodiment the toroidal body is hollow instead of solid and contains a plastic member in part or all of the hollow cavity. This plastic member may be solid or foamed in nature and preferably has shape and contour to fill the hollow cavity. This plastic member will contain sufficient dense matter, preferably particulates, viz. steel or glass balls, rocks, metal strips, etc., to give the density difference desired in the periphery area of the body.

Thus, this game provides attributes that help develop physical fitness by providing exercise that requires reflexes and endurance. Also, it develops the player's skill and coordination while subjecting the player to the excitement of the sport.

While in accordance with the patent statutes the best mode and preferred embodiment of the invention has been described, it is to be understood that the invention is not limited thereto, but rather is to be measured by the scope and spirit of the appended claims.

What is claimed is:

1. A packaged projectile game usable on a playing field with at least one pair of players; including one set of projectiles of one color and at least one other set of projectiles having a different color and a list of rules for playing such game, said projectiles being composed of a hollow plastic smooth toroidal or similar shaped body and adapted to be tossed and caught by hand, with at least one part of said body of between 10 to 30 percent of the total peripheral length comprising a material loaded with a filler having a density of at least 1.5 so as to have an overall density appreciably greater than any other part, and wherein the hollow thereof has a diameter of about 0.5 to about 2.5 inches and the minimum inside diameter of the toroidal body is about 10 to 16 inches.

2. The projectile of claim 1, wherein the toroidal body is hollow and part of the hollow contains a plastic member containing particulates more dense than the plastic.

3. A plastic projectile having a toroidal or similar body shape adapted to be tossed and caught by hand with at least a part of said projectile having a density appreciably greater than any other part, with said part extending along at least about 10 to 30 percent of the total peripheral length of said projectile, and further wherein the part is composed of a plastic loaded with sufficient filler having a density of at least about 1.5, and wherein the projectile is hollow and has a diameter of about 0.5 to about 2.5 inches and the minimum inside diameter of the toroidal body is about 10 to 16 inches.

4. The projectile of claim 3 wherein the toroidal body is formed of a plastic selected from polyethylene, polypropylene, polyvinyl chloride or mixtures thereof.

* * * * *